(12) United States Patent
Lopez et al.

(10) Patent No.: US 11,587,448 B2
(45) Date of Patent: Feb. 21, 2023

(54) SYSTEMS AND METHODS FOR MANIFOLDS LEARNING OF AIRLINE NETWORK DATA

(71) Applicant: GENERAL ELECTRIC COMPANY, Schenectady, NY (US)

(72) Inventors: James G. Lopez, Niskayuna, NY (US); Matthew C. Nielsen, Glenville, NY (US)

(73) Assignee: General Electric Company, Schenectady, NY (US)

( * ) Notice: Subject to any disclaimer, the term of this patent is extended or adjusted under 35 U.S.C. 154(b) by 699 days.

(21) Appl. No.: 16/522,783

(22) Filed: Jul. 26, 2019

(65) Prior Publication Data

US 2021/0027635 A1 Jan. 28, 2021

(51) Int. Cl.
 G08G 5/00 (2006.01)
 G06N 20/00 (2019.01)
 G08B 21/18 (2006.01)

(52) U.S. Cl.
 CPC .......... *G08G 5/0043* (2013.01); *G06N 20/00* (2019.01); *G08B 21/18* (2013.01); *G08G 5/0026* (2013.01)

(58) Field of Classification Search
 CPC .... G08G 5/0043; G08G 5/0026; G06N 20/00; G08B 21/18
 See application file for complete search history.

(56) References Cited

U.S. PATENT DOCUMENTS 6,167,239 A   12/2000  Wright et al.
7,797,367 B1   9/2010  Gelvin et al.
(Continued)

FOREIGN PATENT DOCUMENTS

CN   107844731 A   3/2018
WO   2018122806 A1  7/2018

OTHER PUBLICATIONS

The European Search Report and Written Opinion dated Oct. 6, 2020 which was issued in connection with a counterpart application EP 20179387.4.
Kolawole Ogunsina et. al.: "Dimensionality Reduction in a Data-Driven Model for Airline Disruption Management" AIAA Scitech 2019 Forum Jan. 6, 2019.

(Continued)

*Primary Examiner* — Ramsey Refai
(74) *Attorney, Agent, or Firm* — McGarry Bair PC (57) ABSTRACT

Methods and systems for using manifolds learning of airline network traffic to detect airline network traffic disruptions. In an embodiment, a computer processor transmits a request for abnormal airline network traffic simulation data to a simulation device, receives the abnormal airline network traffic simulation data, and generates, utilizing a manifolds learning process, simulated abnormal airline network traffic manifolds representation data. In some embodiments, the process may next include transmitting a request for current airline network traffic data to a current network traffic computer, receiving the current airline network traffic data, and generating a current airline network traffic dataset. In some implementations, the current airline network traffic dataset is then mapped to the abnormal airline network traffic manifolds representation, a determination made that a threshold number of data points of the current airline network traffic dataset maps to the abnormal airline traffic manifolds representation, and then an alarm is transmitted to an operator device indicating that a disruption of airline network traffic is imminent.

12 Claims, 7 Drawing Sheets

(56) References Cited

U.S. PATENT DOCUMENTS

| | | | |
|---|---|---|---|
| 8,255,100 | B2 | 8/2012 | Schimert |
| 9,052,375 | B2 | 6/2015 | Sampigethaya et al. |
| 9,412,072 | B2* | 8/2016 | Chi ................... G08G 5/0056 |
| 10,074,283 | B1 | 9/2018 | de Oliveira et al. |
| 10,311,378 | B2* | 6/2019 | Nowozin ................ G06T 7/521 |
| 11,087,629 | B2* | 8/2021 | Urbanek ............ H04B 7/18506 |
| 11,100,726 | B2* | 8/2021 | Krupa ................. G08G 5/0026 |
| 2011/0246002 | A1* | 10/2011 | Shavit ................. G08G 5/0043 701/14 |
| 2015/0019070 | A1* | 1/2015 | Chrysanthos ............ G01D 9/00 701/33.4 |
| 2015/0170079 | A1 | 6/2015 | Banerjee et al. |
| 2015/0324501 | A1* | 11/2015 | Desell ................... G01C 23/00 703/2 |
| 2016/0035225 | A1* | 2/2016 | Berckefeldt ......... G08G 5/0021 342/32 |
| 2016/0107765 | A1* | 4/2016 | Dani ................... G05B 23/0251 701/29.1 |
| 2016/0314692 | A1* | 10/2016 | Bahrami .............. G08G 5/0017 |
| 2017/0106997 | A1* | 4/2017 | Bekanich ............... G08B 25/10 |
| 2018/0288080 | A1 | 10/2018 | Keller et al. |
| 2018/0348250 | A1* | 12/2018 | Higgins ................ G01C 23/00 |
| 2020/0298993 | A1* | 9/2020 | Li ........................ G08G 5/0017 |
| 2020/0339109 | A1* | 10/2020 | Hong ................... G06K 9/6256 |

OTHER PUBLICATIONS

Neal Patwari et. al.: "Manifold Learning Visualization of Network Traffic Data"; Proceeding of the 2005 ACM Sigcomm Workshop on Delay-Tolerant Networking, WDTN '05.

Neal Patwari et. al.: "Manifold Learning Visualization of Network Traffic Data", ACM 2001.

Herbert Naessens: "Predicting flight routes with a Deep Neural", Eurocontrol, Dec. 17, 2017.

* cited by examiner

SYSTEMS AND METHODS FOR MANIFOLDS LEARNING OF AIRLINE NETWORK DATA

FIELD OF THE INVENTION

Embodiments generally pertain to systems and methods for detecting and/or predicting airline network disruptions utilizing manifolds learning of airline network data. More specifically, systems and methods are disclosed which utilize manifolds learning to reduce high dimensional airline network traffic data into lower dimensional representations that can then be more readily analyzed for anomalies.

BACKGROUND

Airlines lose millions of dollars every year due to airline network disruptions. In particular, airline network disruption and recovery is an enormously complicated and costly problem for airlines and for the flying public.

The Airline Operations Center (AOC) of major airlines are tasked with managing the execution of thousands of flights a day, including making adjustments in real time concerning the movements of aircraft and crewmembers to minimize costly delays and cancellations, while at the same time complying with complex maintenance and routing constraints. Operators are responsible for preparing flight plans, adjusting the airline schedule including, but not limited to, flight schedule, departure slot assignments, aircraft assignments and crew assignments in response to various factors which may include weather-related issues and various types of equipment failures. Major airlines thus struggle to manage vast amounts of operations-related data efficiently in an attempt to alleviate the impact(s) of unforeseen aircraft schedule disruptions, and to manage the future ramifications of an aircraft failure or scheduling delay on related, interdependent, and/or unrelated flights or routes in an airline network. For example, an aircraft scheduling delay may impact multiple routes after one or more legs of the current aircraft route are executed.

A typical AOC is a very busy environment where airline network decisions must be made quickly and accurately because such decisions made by the aircraft operations personnel can have great operational and economic impacts on the airline. Since an airline network is an extremely complicated system of systems that behaves in a stochastic manner, it is very difficult for human network operators to detect early signs of impending disruptions.

Airline network traffic data is an example of high-dimensionality data which makes it difficult for machine learning algorithms to operate on airline network traffic data. High-dimensionality data has been defined as data that requires more than three dimensions to represent, which can be difficult for a human to interpret. An approach to simplification of such high-dimensionality data is to assume that the data of interest lie on an embedded, non-linear manifold within the higher-dimensional space. If the manifold is of low enough dimension, then the data can be visualized in a low-dimensional space for example, by display on a display screen as a two-dimensional (2D) or three-dimensional (3D) representation for viewing by a human operator. Thus, manifold learning is an approach to non-linear dimensionality reduction, and algorithms for this task are based on the idea that the dimensionality of many data sets can be represented with low dimensionality and still retain the most important features in the data set.

The inventors recognized that there is a need for providing machine learning techniques to help airline personnel mitigate and/or prevent costly airline network disruptions. In particular, the inventors recognized that machine learning techniques could be utilized to classify normal and abnormal airline network conditions data so that airline operations center (AOC) personnel can take action(s) before a major airline disruption evolves, or can detect the start of a potential airline network disruption to permit early remedial action(s) to be taken, which could potentially enable an airline to save millions of dollars per year in operating costs.

SUMMARY

Presented are methods, non-transient computer readable media, and systems that use manifolds learning of airline network traffic to detect airline network traffic disruptions. In an embodiment, a computer processor transmits a request for abnormal airline network traffic simulation data to a simulation device, receives the abnormal airline network traffic simulation data, and generates, utilizing a manifolds learning process, simulated abnormal airline network traffic manifolds representation data. In some embodiments, the process may also include transmitting a request for normal airline network traffic simulation data from the simulation device, receiving the normal airline network traffic simulation data, and generating using the manifolds learning process, simulated normal airline network traffic manifolds representation data. In addition, the process may include transmitting a request for current airline network traffic data to a current network traffic computer, receiving the current airline network traffic data, and generating a current airline network traffic dataset. In addition, the computer processor may map the current airline network traffic dataset to the abnormal airline network traffic manifolds representation, determine that a threshold number of data points of the current airline network traffic dataset map to the abnormal airline traffic manifolds representation, and transmit an alarm indicating that a disruption of airline network traffic is imminent to an operator device. Also, in some embodiments, the computer processor may also map the current airline network traffic dataset to the abnormal airline network traffic manifolds representation, determine that a threshold number of data points of the current airline network traffic dataset do not map to the abnormal airline traffic manifolds representation, and then transmit an indication of normal airline network traffic to an operator device.

In some implementations, the computer processor may transmit a request for current airline network traffic data to a current network traffic computer, receive the current airline network traffic data, generate a current airline network traffic dataset, map the current airline network traffic dataset to the normal airline network traffic manifolds representation, determine that a threshold number of data points of the current airline network traffic dataset map to the normal airline traffic manifolds representation, and transmit an indication of normal airline network traffic to an operator device. In some other embodiments, the computer processor may map the current airline network traffic dataset to the abnormal airline network traffic manifolds representation, display a visual manifolds representation of the abnormal airline network traffic and data points associated with the current airline network traffic dataset on a display device, determine that a threshold number of data points of the current airline network traffic dataset map to the abnormal airline traffic manifolds representation, and transmit an alarm indicating that a disruption of airline network traffic is imminent to an operator device. In yet another implementation, the computer processor may transmit a request for current airline network traffic data to a current network traffic computer, receive the current airline network traffic data, generate a current airline network traffic dataset, map the current airline network traffic dataset to the normal airline network traffic manifolds representation, display a visual manifolds representation of the normal airline network traffic and the data points associated with the current airline network traffic dataset on a display device, determine that a threshold number of data points of the current airline network traffic dataset map to the normal airline traffic manifolds representation, and then transmit an indication of normal airline network traffic to an operator device.

Also disclosed herein are non-transitory computer-readable media which store executable instructions that, when executed by a computer processor, causes the computer processor to utilize manifolds learning of airline network traffic to detect airline network traffic disruptions, in the manner described above. In addition, systems for detecting airline network traffic disruptions are described. In an embodiment, a system for detecting airline network disruptions includes a user computer including a user computer processor operably connected to a non-transitory storage device and to a display device, an historical airline network traffic database operably connected to the user computer, a simulation device operably connected to the user computer, and a current airline network traffic computer operably connected to the simulation device. In some implementations, the non-transitory storage device of the user computer stores executable instructions which when executed cause the user computer processor to function in the manner described above, to detect airline network traffic disruptions.

A technical advantage of embodiments disclosed herein is using machine learning techniques to help airlines mitigate and/or eliminate costly airline network traffic disruptions. Specifically, machine learning techniques are utilized to process high dimensional airline network traffic data in order to solve an airline network traffic problem that is enormously difficult for humans to solve. Use of the processes described herein may advantageously help airlines save millions of dollars in operating costs by mitigating and/or preventing airline network traffic disruptions.

BRIEF DESCRIPTION OF THE DRAWINGS

Features and advantages of some embodiments of the present disclosure, and the manner in which the same are accomplished, will become more readily apparent upon consideration of the following detailed description taken in conjunction with the accompanying drawings, which illustrate exemplary embodiments and which are not necessarily drawn to scale, wherein.

DETAILED DESCRIPTION

In the following detailed description, numerous specific details are set forth in order to provide a thorough understanding of embodiments. However, it will be understood by those of ordinary skill in the art that some of the embodiments may be practiced without these specific details in accordance with the present disclosure. In other instances, well-known methods, procedures and/or components have not been described in detail so as not to obscure the embodiments.

In general, and for the purpose of introducing concepts of novel embodiments disclosed herein, presented are methods and systems for utilizing a process which includes manifolds learning on airline network data for the purposes of detecting and/or predicting airline network disruptions. More specifically, systems and methods are disclosed herein which reduce high-dimensionality airline network traffic data into lower dimensionality representations which makes the data more amenable to correct classification by machine learning algorithms, such as Deep Neural Networks (DNN), and which can then be visually presented to airline personnel for interpretation. Thus, in some embodiments airline network traffic data is subjected to manifolds learning and then represented in low dimension manifolds. Next, a DNN is utilized to analyze the airline network traffic data for anomalies which may potentially lead to network disruptions, and any identified anomaly then can be brought to the attention of airline personnel.

In addition, in some embodiments a manifolds learning algorithm is trained to generate and to segregate manifolds that represent normal airline network traffic data and abnormal airline network traffic data. For example, the manifolds learning algorithm can be trained with historical and simulated airline network traffic data representing normal and abnormal features, respectively. Once the manifolds representing normal and abnormal network behaviors are learned, a dataset representing real-time airline network traffic data (a current state of the airline network) can be generated and then mapped to the manifolds representing normal and abnormal network behavior in order to detect early indications of an impending network disruption during actual airline operations. If a current airline network traffic real-time dataset maps to a manifold representing abnormal features, in some implementations a flag may be set and/or a warning can be raised to inform airline traffic network operations personnel to pay careful attention to current airline traffic network operations and/or to prompt them to take specific actions to prevent and/or curtail an impending disruption. Also, if a current airline network traffic real-time dataset maps to a manifold representing normal features (or very nearly maps to such a manifold) then in some implementations an indication or message can be transmitted to airline traffic network operations personnel that current airline traffic network operations data is indicating normal behavior.

It should be understood that the concepts, systems, apparatus and processes disclosed herein concerning using manifolds learning on airline network data for the purposes of detecting and/or predicting airline network disruptions could also be applied to other types of transportation-related data, for example, to detect and/or predict other types of transportation network disruptions. For example, a trucking company may have a fleet of trucks which are operated by different types of drivers (for example, company fleet drivers and/or independent truck drivers), and/or may include autonomous driving trucks, and which may be used to transport different types of cargo and/or products (some of which may be fragile and/or have expiration dates) to various different destinations or locations within one or more countries. Such a trucking company may therefore generate many different types of trucking network data, and the processes disclosed herein could be utilized to reduce high-dimensionality trucking network traffic data into lower dimensionality representations which makes the data more amenable to correct classification by machine learning algorithms, such as Deep Neural Networks (DNN), and which can then be visually presented to trucking company personnel for interpretation. Thus, the systems, apparatus and methods herein could be utilized to analyze many different types of transportation-related data, which could be generated by, for example, trucking companies, passenger train networks, freight train networks, taxi networks and/or taxi companies, bicycle delivery companies, shipping companies (both passenger ships and/or container ships or the like carrying freight), and perhaps future transport-related organizations or entities, such as drone companies (which may utilize drones to deliver items and/or to gather data, for example, crop-related data for farmers).

Figure 1:
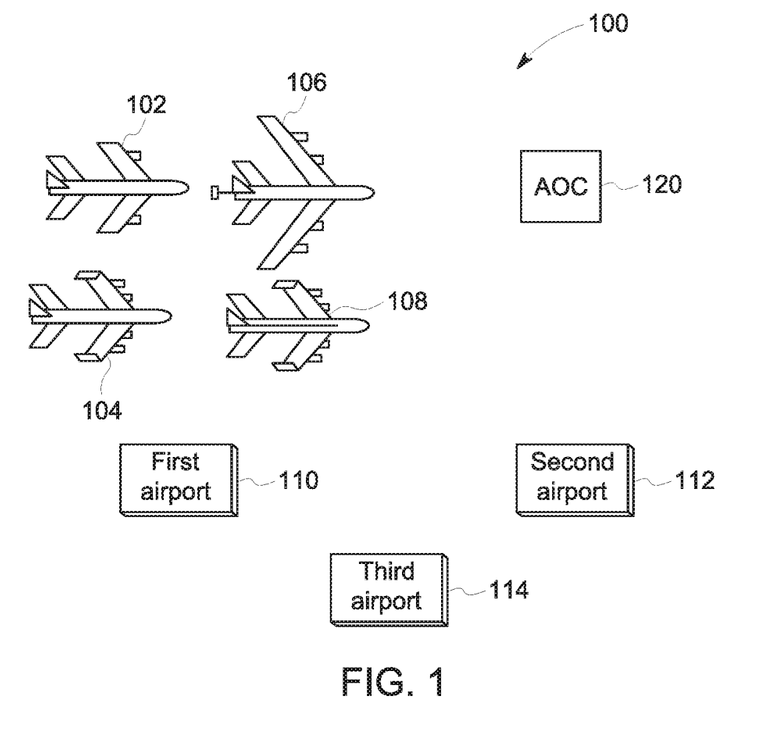
FIG. 1 is a simplified schematic diagram of an example airline including various aircraft to illustrate various types of data which may be taken into consideration concerning airline network traffic.

An introduction to an airline environment and some of the problems that arise during operations is now presented in order to facilitate an understanding of the disclosed processes, systems and apparatus. An airline may operate hundreds of aircraft, employ thousands of crewmembers and support staff, and conduct extensive aircraft maintenance during normal operation. Thus, aircraft operations personnel must take a wide variety of informational data into account before making any airline network operational decisions that could affect the entire airline network. FIG. 1 is a simplified schematic diagram of an example airline 100 to illustrate the various types of information which may be taken into consideration and is presented herein without undue complexity for informational purposes.

Referring to FIG. 1, the airline 100 includes four aircraft 102, 104, 106 and 108, which are all currently located at a first airport 110, and an Airline Operations Center (AOC) 120. Any or all of the four aircraft may fly to either a second airport 112 or a third airport 114. It should be understood that the aircraft 102, 104, 106 and 108 may be identical or may be different makes and/or models of airplanes, with differing functionality and traveler capacity, and thus may or may not be available for swapping with one another. In a particular example, aircraft 102 is scheduled to fly from first airport 110 to second airport 112 and then to third airport 114 and back to the first airport 110; aircraft 104 is scheduled to fly from first airport 110 to third airport 114 and then back to the first airport 110; aircraft 106 is to fly from the first airport 110 to the third airport 114 and remain until the next day; and aircraft 108 is scheduled to fly from first airport 110 to the third airport 114 and then on to the second airport 112.

During normal airline operation, aircraft operations personnel at the AOC 120 may be alerted to the fact that a fault has arising in one or more of the aircraft 102, 104, 106 and 108 and then have to decide on a course of action. For example, an AOC operator may utilize a computer with a display screen to receive data and/or indications which are displayed on the display screen indicating that an issue or issues involving aircraft 102 has or is occurring. For example, an AOC operator may be informed that aircraft 102 is disabled and then need to find availability of a part to replace a faulty or failing aircraft part or component, and find availability of a mechanic or shop at the corresponding airport to attend to fixing the aircraft by repairing or by replacing the faulty part. In addition, if the scheduled take-off of aircraft 102 is to be delayed then the AOC operator may need to determine the availability of a second crew to fly the aircraft 102 once it is repaired, and the availability of an alternative plane to be swapped with the faulty aircraft 102 so that the scheduled flight occurs. To further complicate matters, some airports may not be able to handle certain airplane faults due to, for example, lack of particular equipment necessary to make a repair and/or to replace a part.

For purposes of an example, it may be understood that all the aircraft 102, 104, 106 and 108 are at the airport 110 at the same time, that aircraft 102 will be the first to leave the airport 110, and that flights on the aircraft 104, 106 and 108 are not scheduled to leave until several hours after the scheduled departure of the aircraft 102. Before aircraft 102 departs, a fault occurs with no warning that essentially disables the aircraft 102. In some circumstances, airline operations personnel at the AOC 120 may have very limited options which may include either delaying the flight and fixing the problem at airport 110 (assuming the availability of any needed part(s) and a mechanic) or canceling the scheduled flight, either of which may result in large costs to the airline. However, because aircraft 104, 106 and 108 are not scheduled to leave for several hours, an operator at the AOC 120 may be able to simply swap aircraft 104 for aircraft 102, and then have a mechanic attempt to fix aircraft 102 before the departure time originally scheduled for aircraft 104 occurs. Such a swap may only be an option if the aircraft 104 and the aircraft 102 are similar in size, can accommodate the same number of passengers, and if the requisite part(s), mechanic and/or shop capacity are available. All of the informational data concerning parts and available personnel at airport 110 may be known by the operator at the AOC, which is helpful when trying to decide a best course of action. However, in some cases a required part or parts and/or personnel may only become available at some later time, which may also have a changing probability of being available at some future time. For example, aircraft 106 and aircraft 108 may not be available for departure at the time originally scheduled for aircraft 102, and/or there may be no alternate crew availability until a later time, and/or a replacement part may not become available at the airport 110 until shortly after the scheduled departure time of aircraft 102 and a mechanic is available to make the repair. Given the above information, an AOC operator may decide to swap the alternate airplane 104 for the airplane 102 and have the original crew (from aircraft 102) fly it, and have the aircraft 102 repaired at airport 110 at the later time.

While the operations outlined above in the example do not seem unduly complicated, in a more typical and complex airline scenario such changes in aircraft and/or flight schedules may have unforeseen impacts and/or adverse ripple effects on other flights of the airline and therefore detrimentally affect total airline network cost. In particular, an actual airline may schedule thousands of flights a week, may employ hundreds of different airline flight crews based in different cities, may have hundreds of aircraft of different types, and can have varying resources at each airport. In addition, there are many other variables and/or considerations that may impact a particular decision, such as the weather conditions in one or more regions across the country which may adversely impact aircraft flight departure and/or flight arrival times. Moreover, with a variety of decisions that the aircraft operations personnel may make at any one time, a single decision that seems like the best solution for a particular problem or issue at the time may eventually end up causing multiple flight cancellations later in the day, which can cascade across multiple scheduled flights and raise operational costs which could have been avoided if AOC personnel had an early warning of a potential airline network disruption.

Accordingly, embodiments described herein utilize a manifold learning method to process very high-dimensionality airline network traffic data received in real-time while airline operations are occurring from one or more airline operations centers (AOCs), and then reduce their dimensionality to lower dimensionality for purposes of machine processing and representation in dimensions that are understandable by a human (e.g., two-dimensional (2D) and three-dimensional (3D) data representations). In some embodiments, the resulting 2D or 3D "maps" of the current airline traffic data measurements are mapped onto manifolds representations (2D or 3D representations) of normal airline traffic behavior and to manifolds representations of abnormal airline traffic behavior for comparison, so that an AOC operator can form an opinion concerning whether or not the state of the current airline network traffic data is problematic. This provides a way for an AOC operator, for example, to visualize the relationships which exist in a set of current airline traffic network data as compared to those of a normal manifolds representation and/or an abnormal manifolds representation. Accordingly, in some embodiments the spatial relationships are displayed on a display screen for viewing by AOC personnel, and may be complementary to other types of detection methods, which also may rely on dimensionality reduction.

Manifold learning encompasses a variety of methods to approximate in a low dimensional space (such as two-dimensional (2D) space) the relationships between data points which lie on a manifold in a high dimensional space. Classical multi-dimensional scaling (MDS) and principal components analysis (PCA) may be the most commonly recognized dimensionality reduction methods, but these methods assume that the high-dimensionality data points lie on a linear subspace (for example, on a 2D plane) of the high-dimensionality space. In contrast, Manifold learning algorithms are more general in that the data may lie on a curved subspace. For example, a 2D manifold could be a portion of a sphere. When high dimensional data points are random but highly correlated with their close neighbors, data points do not tend to fall into linear subspaces. As a result, manifold learning methods can be more effective than linear methods like MDS.

In a particular example, a distributed weighted MDS ("dwMDS") method, which is a known method, can be utilized. Key features of the dwMDS include a distributed implementation that allows for generation of an airline network state that can be calculated in a distributed manner across the airline network, and consideration of prior information which allows use of a "typical" or "normal" map to be used as a baseline, thus allowing for easy comparison of data maps over time. In addition, the dwMDS can include a weighted cost function that allows neighbor relationships that are believed to be more accurate to be weighted more heavily, and a majorization method which has the property that each iteration is guaranteed to improve the value of the cost function.

The dimensionality reduction problem can be framed as a multiple dataset problem. In the current airline network data framework, airline network traffic data can come from many different sources in real time, and this data can impact aircraft operability and/or airline scheduling. The data required for representing and analyzing airline network operations may include flight data aircraft data, sub-fleet data, crew information, crew rules information, aircraft maintenance information, airport information, passenger information and weather related data. Such information may be characterized as follows:

Flight data can include information concerning scheduled flights, estimated and actual flight times, and airport and terminal and gate assignments for departures and arrivals;

Aircraft data can include information concerning specific aircraft, their assignments to sub-fleets and/or fleets, operational restrictions, assigned flights and assigned planned maintenance;

Sub-fleets data can include sub-fleet and/or fleet hierarchy information, operational configuration(s), performance data and restrictions data;

Crew information can include pilot and flight attendant pairings along with their schedules or assignments to flights, pilot qualifications data and pilot flying history data associated with rules compliance;

Crew rules information can include rules data that governs work time, flight time, rest time and qualifications for pilots and flight attendants;

Aircraft maintenance information can include scheduled maintenance events assigned to specific aircraft, and the like;

Airports information can include data representing availability and capacity, as well as sub-fleet/fleet restrictions, and may include curfew information; and Passengers information can include data representing loads on flights, connections between flights and individual itineraries between origins and destinations; the passenger data may also include differentiators such as frequent flier status, special service needs and restrictions associated with passengers' nationalities and associated visa requirements.

The examples of airline network traffic data presented above may be obtained from the airlines (e.g. Delta, American, United, JetBlue, and the like) themselves. An aviation company may therefore contract with the airlines to gain access to such data to provide airline network information or data in real time. In addition to the airline network traffic data mentioned above, current weather data and/or weather forecasts is/are critical as the weather in one or more locations or regions may impact airline flights across one or more countries, regions and/or continents. Weather data is publicly available from sources such as the National Weather Service in the United States and/or from publicly available online weather websites, such as Accuweather.com, and may also be available and/or obtained from one or more airlines or from private weather data services (in some cases, for a fee). In addition, fewer or more data sources could be utilized when considering the status of airline network traffic, and thus the airline network traffic data can be of an arbitrarily high dimension.

Figure 2:
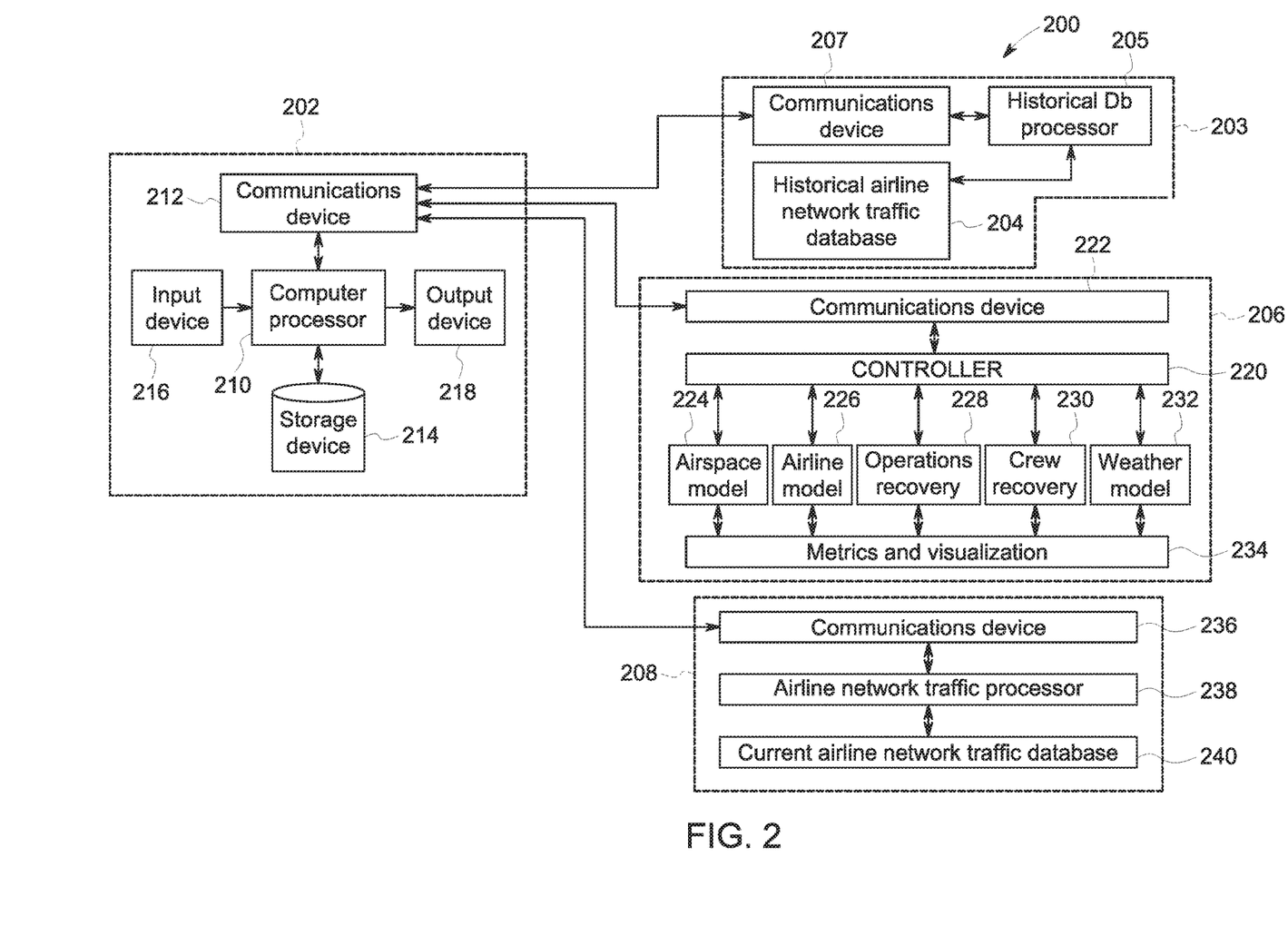
FIG. 2 is a block diagram of an airline network traffic data manifolds learning system in accordance with some embodiments of the disclosure.

FIG. 2 is a block diagram of an airline network traffic data manifolds learning system 200 in accordance with some embodiments. The airline network traffic data manifolds learning system 200 may include a user computer 202, a historical airline network traffic computer system 203, a simulation device 206, and current network traffic computer 208. The user computer 202 may, for example, be a personal computer, laptop computer, mobile telephone, smartphone or the like that is controlled by software and/or applications to cause it to function in the manner described herein.

Referring to FIG. 2, the user computer 200 may include a computer processor 210 operatively coupled to a communication device 212, a storage device 214, an input device 216 and an output device or display device 218. In some implementations, the user computer 202 may be operated by airline personnel, such as an airline operations center (AOC) operator tasked with monitoring airline network traffic.

The computer processor 210 may be constituted by one or more processors, which may include specially designed processors, and which operate to execute processor-executable steps, contained in program instructions described herein, so as to control the user computer 200 to provide desired functionality. The communication device 212 of the user computer 200 may be used to facilitate communication with, for example, other devices such as the historical airline network traffic computer system 203, the simulation device 206, and the current network traffic computer 208. The communication device 212 may also be used to facilitate communication with other computers and/or electronic devices (not shown) operated by airline personnel and the like. The input device 216 may include one or more of any type of peripheral device typically used to input data into a computer. For example, the input device 216 may include a keyboard and/or a mouse and/or a joystick and/or a touch-screen. The output device 218 may include, for example, an electronic display (such as a flat screen and/or touch screen) and/or a printer.

Storage device 214 may include any appropriate information storage device, including combinations of magnetic storage devices (e.g., hard disk drives), optical storage devices such as CDs and/or DVDs, and/or semiconductor memory devices such as Random Access Memory (RAM) devices and Read Only Memory (ROM) devices, as well as flash memory and/or bubble memory. Any one or more of such information storage devices may be considered to be a non-transitory computer-readable storage medium or a non-transitory computer usable medium or a memory. In some embodiments, the storage device 214 stores one or more computer programs or applications for controlling the processor 210. The programs include program instructions (which may be referred to as computer readable program code means) that contain processor-executable process steps of the user computer 202, executed by the computer processor 210 to cause the user computer 202 to function as described herein.

The programs stored in the storage device 214 may include one or more operating systems (not shown) including executable instructions which, when executed control the processor 210 to manage and coordinate activities and sharing of resources in the user computer 202, and to serve as a host for application programs that run on the user computer 202. The programs stored in the storage device 214 may also include a manifolds learning application (not shown) including instructions which when executed cause the user computer processor 210 to process airline network traffic data and/or other data inputs or dataset inputs and to provide output data. The output data of the manifolds learning application can then be utilized and/or processed as described herein to provide output data which correspond to a "normal" and/or an "abnormal" airline network traffic data.

In some embodiments, the normal airline network traffic data may be utilized to generate a normal airline network traffic manifolds representation, and the abnormal airline network traffic dataset may be utilized to generate an abnormal airline network traffic manifolds representation, which representations may be presented on a display screen for viewing by airline personnel. In some embodiments, current airline network traffic data provided by the current network traffic computer 208 may also be utilized as an input to the manifolds learning application and the output data utilized to generate a current airline network traffic dataset, which can then be mapped to the normal airline network traffic manifolds representation and to the abnormal airline network traffic manifolds representation displayed on the display screen 218. In some embodiments, airline personnel may then compare the mapped current airline network traffic dataset to the normal and abnormal network traffic manifolds representations and then decide, for example, whether an airline network disruption appears to be imminent and/or whether to take any action, such as raising an alarm or taking preventive action(s), in accordance with processes described herein. In other implementations, the computer processor 210 may automatically compare the mapped current airline network traffic dataset to the normal and abnormal network traffic manifolds representations and then determine whether or not to set a flag indicating that an airline network traffic disruption is imminent, or is occurring, and/or otherwise provide an indication of the current state of airline network traffic. In this case, the computer processor 210 may determine that a threshold number of the data points of the current airline network traffic dataset map to the abnormal airline network traffic manifolds representation, and then transmit an alarm message indicating that disruption of airline network traffic may be imminent. The threshold number may be reached when a majority of the data points in the current airline network traffic dataset map to the abnormal airline network traffic manifolds representation. In some implementations, airline personnel (or other authorized person) may set the threshold number to be equal to a lower number (for example, equal to or less than half the of the data points in the current airline network traffic dataset), and/or the computer processor 210 may weigh certain types of current airline network traffic data differently than others when determining the threshold number.

Other programs stored in the storage device 214 may include a database management program, communication software, device drivers, and the like. The storage device 214 may also include one or more databases (not shown) required for operation of the user computer 202.

Referring again to FIG. 2, the historical airline network traffic computer system 203 includes a historical airline network traffic database 204 operably connected to a historical database computer 205, which is operably connected to a communications device 207. The historical airline network traffic database 204 may be any suitable database, including a single database having multiple sets of data, multiple discrete databases linked together, or even a simple table of data. Regardless of the type of database, the historical airline network traffic database 204 is a non-transitory storage medium that may be provided on a computer readable medium. In some embodiments, the historical airline network traffic database 204 is computer searchable via the historical database processor 205 and communications device 207, and may include data sets that are related to both historical normal operating conditions of an airline network and historical airline network traffic data associated with abnormal airline operating conditions. Such historical airline operating conditions data may be provided by one or more airlines, and may be segregated by airline. Thus, the historical network traffic database 204 may store data such as, but not limited to, historical flight data, aircraft data, sub-fleet data, crew information, crew rules information, aircraft maintenance data, airport data, passenger data and weather data. Other types of historical data may also be included, which may be airline-specific data, for example. Such a historical airline network traffic dataset may be useful to fill in some gaps which may occur in the simulated airline network traffic datasets due to unavailability of some types of data which may cause airline traffic network delays.

As also shown in FIG. 2, a simulation device 206 includes a controller 220 operably connected to a communications device 222 which may be used to facilitate communications with, for example, other devices such as the user computer 202. The controller 220 may include one or more processors or microprocessors and is also operably connected to an airspace model 224, an airline model 226, an operations recovery database 228, a crew recovery database 230 and a weather model 232, which in turn are all operably connected to a metrics and visualization application 234. These models are used in computer simulations that can include, for example, multiple aircraft taking off and landing at multiple airports, and wherein airline network disruptions can be artificially introduced, for example, by an operator to the simulation(s). The simulation device 206 can be utilized to create datasets containing data that can be used to train a manifolds learning algorithm to recognize "good" network states and "bad" network states. In addition, in some embodiments the metrics and visualization application is provided in a dashboard (not shown) which an operator can utilize to observe key data parameters from any specific simulation, which key data parameters may be associated with strong indicators of good behaviors and/or strong indicators of anomalous or abnormal behaviors, and which can be thought of as the "vital signs" associated with the "health" of an airline network.

Referring again to FIG. 2, the current network traffic computer 208 includes a communications device 236, an airline network traffic processor 238 and a current airline network traffic database 240. In some embodiments, the current network traffic computer 208 provides the user computer 202 with current airline network traffic data, such as data concerning the current status of aircraft, current flight crew status, current weather data (which it may obtain from various sources (not shown), for example, the U.S. national weather service and/or other public sources), and other data. Such data may be obtained from various sources (not shown) and stored in the current network traffic database 240. The user computer 202 utilizes such data to generate current airline network status data which may then be compared to abnormal and/or to normal airline network traffic manifolds representations in accordance with processes described herein.

Figure 3:
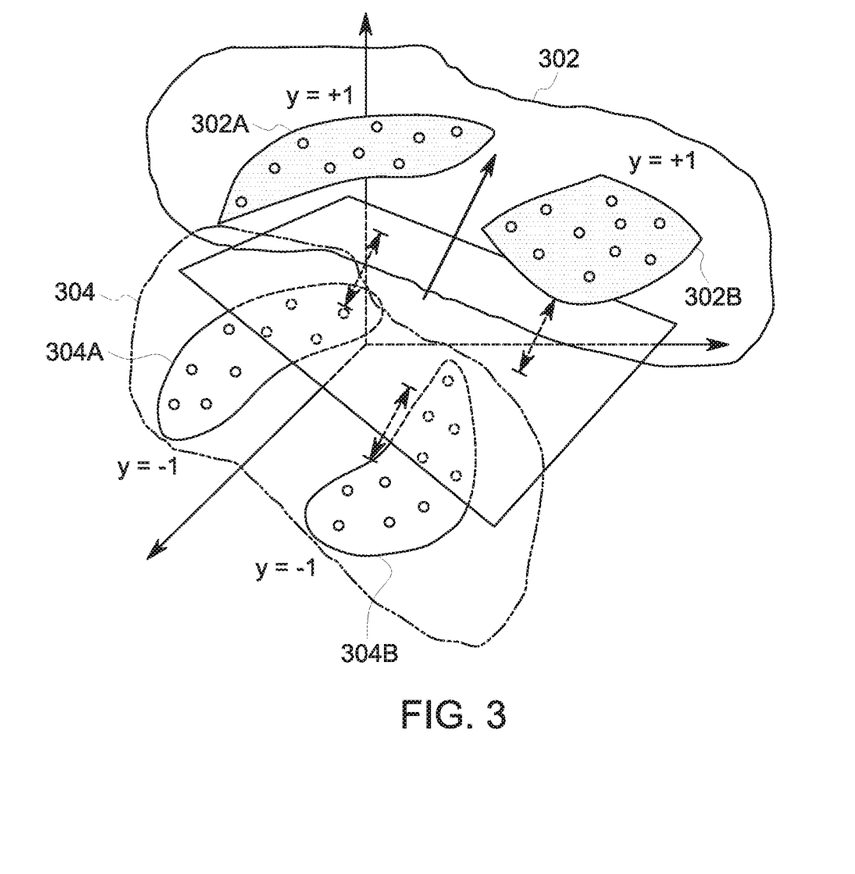
FIG. 3 illustrates example manifolds representations of a type which may be associated with airline network traffic data in accordance with embodiments of the disclosure.

FIG. 3 is a diagram illustrating example manifolds representations 300 of a type which may be associated with airline network traffic data in accordance with embodiments described herein. As shown, the manifolds representations may include several two-dimensional (2D) manifolds representations which may be displayed on a display screen 218 of the computer 202 shown in FIG. 2. For example, the manifolds representations 300 may include a normal airline traffic operation manifolds representation 302, which includes manifold representations 302A and 302B, and an abnormal airline traffic operation manifold representation 304, which here includes manifold representation 304A and 304B. Thus, the manifold representations 302A and 302B may be associated with "normal" airline network traffic, while the manifold representations 304A and 304B may be associated with "abnormal" airline network traffic. In some embodiments, the user computer processor 210 may also obtain current airline network traffic datasets and then map the current airline network data (not shown) to the normal airline traffic operation manifold representation 302 and to the abnormal airline traffic operation manifold representation 304 for comparison.

Accordingly, with reference again to FIG. 2, in some embodiments the simulation device 206 may receive instructions from the user computer 202 to generate data sets associated with the normal airline network traffic behavior and associated with abnormal airline network traffic. These datasets can then be fed as input to the manifolds learning algorithm run by the user computer processor 210 to generate the normal airline traffic operation manifolds representation 302 (which includes manifolds representations 302A and 302B) and the abnormal airline traffic operation manifold representation 304 (which includes manifolds representations 304A and 304B) as shown in FIG. 3. A user may also instruct the user computer 202 to obtain historical airline network traffic data from the historical airline network traffic computer system 203, and then to generate one or more normal and/or abnormal manifolds representations (not shown) based on that historical data. In some implementations, historical airline network traffic data corresponding to abnormal airline network behavior may be combined with simulation data associated with abnormal airline network behavior and used as input to the manifolds learning algorithm run by the user computer processor 210 to generate an abnormal airline network manifolds representation. Similarly, the user computer 202 may receive historical airline network traffic data corresponding to normal airline network behavior and simulation data associated with normal airline network behavior and use such data as input to the manifolds learning algorithm run by the user computer processor 210 to generate a normal airline network manifolds representation. In addition, the user computer 202 may obtain current airline network traffic data from the current network traffic computer 208 via the communications device 236 and generate one or more datasets representing current airline network behavior. Thus, in some embodiments, a user may utilize the user computer 202 to request current airline network traffic data and use it to generate a current airline network traffic dataset which data can be compared to the normal airline traffic operation manifolds representation 302 and/or to the abnormal airline traffic operation manifold representation 304 shown in FIG. 3.

Figure 4:
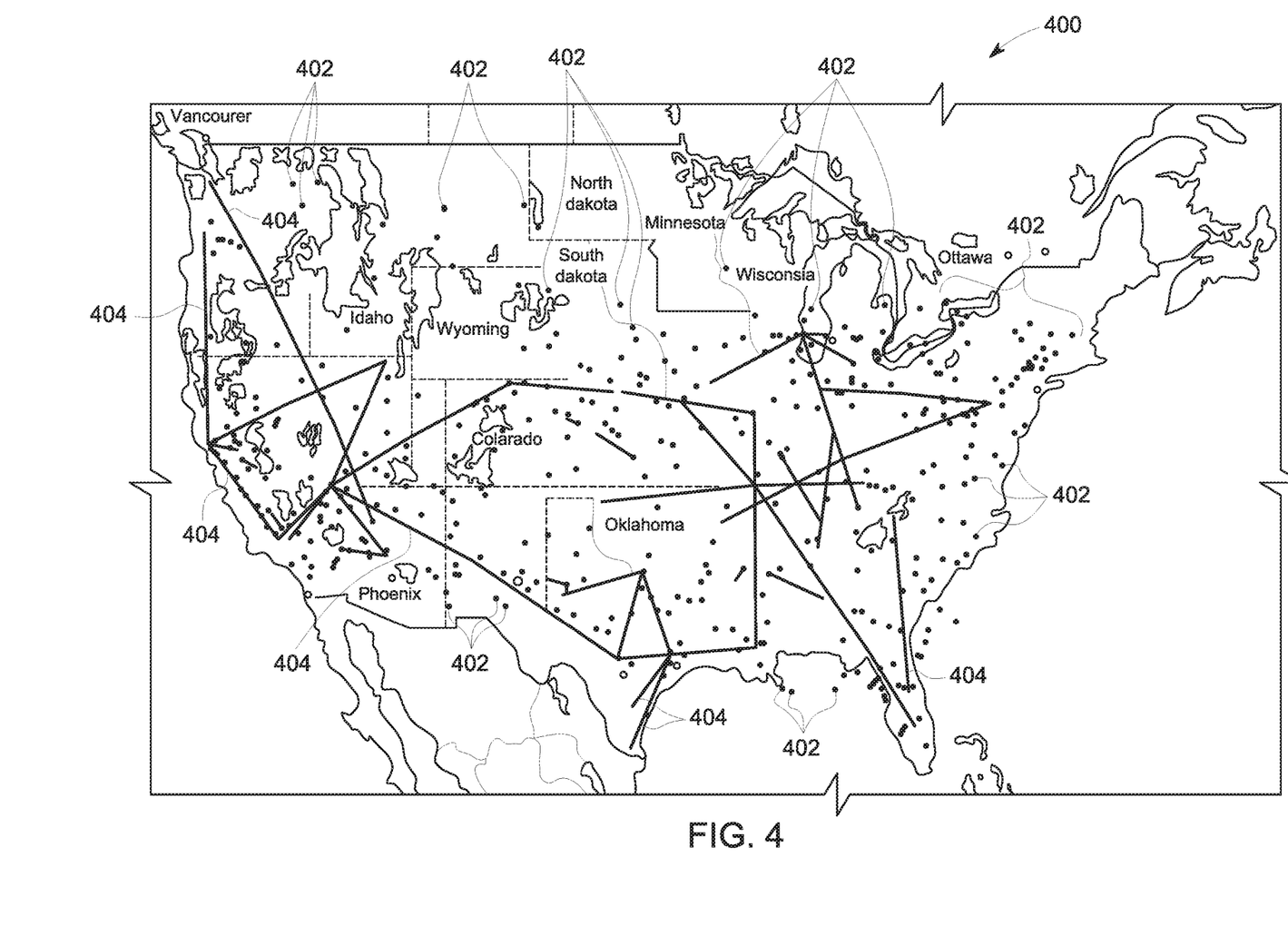
FIG. 4 depicts an example of a current airline network performance map which may be displayed on the display screen of the user computer in accordance with some embodiments of the disclosure.

FIG. 4 depicts an example of a current airline network performance map 400 which may be displayed on the display screen 218 of the user computer 202 in accordance with the disclosure. The storage device 214 of the user computer 202 may include a mapping application (not shown) which includes executable instructions which when executed provides current airline network performance map data that can be utilized to generate the current airline network performance map 400 for display on the display screen 218. The current airline network performance map 400 may be recognized as a snapshot of a moment in time which depicts aircraft 402 (black dots) that are flying over the United States as well as solid-line representations 404 (solid lines) which indicate the length of delay for any particular flight. Depending on the time of year (or season), time of day, the weather and/or other factors, FIG. 4 may be depicting what is considered as a normal airline network traffic map. However, in some cases the mapping 400 may be considered abnormal, for example, the data may indicate deterioration of the performance of the airline network traffic. Such indications may be color coded (not shown) for easy recognition by airline personnel.

Figure 5:
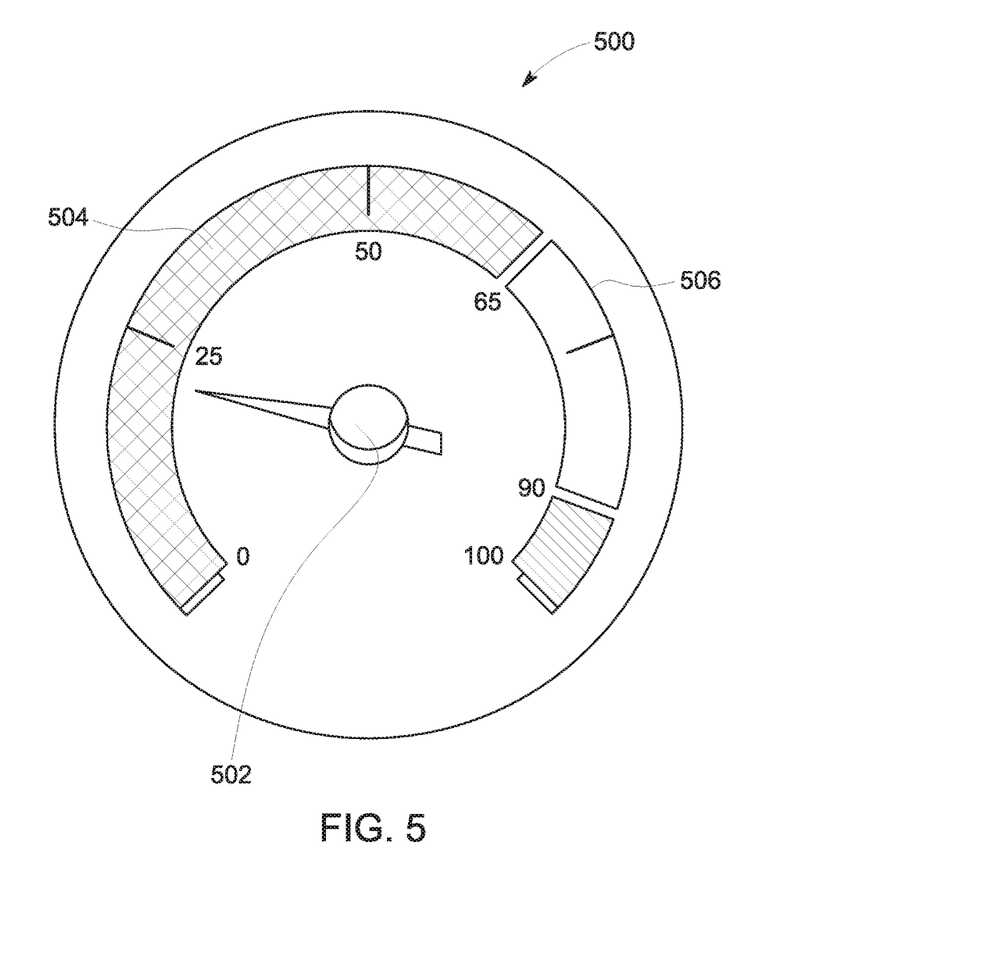
FIG. 5 depicts an example of a current airline network performance meter which may be displayed on a display screen of the user computer in accordance with some embodiments.

FIG. 5 depicts an example of a current airline network performance meter 500 which may be displayed concurrently with the current airline network performance map 400 of FIG. 4, or by itself on the display screen 218 of the user computer 202 in accordance with some embodiments. In this example of an airline network performance meter 500, an indication that an indicator needle 502 is pointing anywhere within the region 504 between zero (0) to approximately sixty-four (64) may be considered to indicate that the current network airline performance is trending towards a "bad" to a "poor" state, whereas an indication that the needle 502 is pointing to the region 506 between sixty-five (65) to ninety (90) may be considered to indicate that the current network airline performance is trending towards a "good" state, and an indication that the needle 502 is pointing to the region between ninety (90) to one-hundred (100) may be considered to indicate that the current network airline performance is trending towards an "excellent" state. In the specific example of FIG. 5, the indicator needle 502 is at approximately twenty-three (23), which is in the region 504 indicating that the current airline network data is trending towards a "bad" to "poor" state. When this occurs, an AOC operator may decide that, due to the bad health of the current airline network traffic, an intervention may be required to correct one or more problems which are occurring and that may end up causing further airline network traffic delays.

Figure 6A:
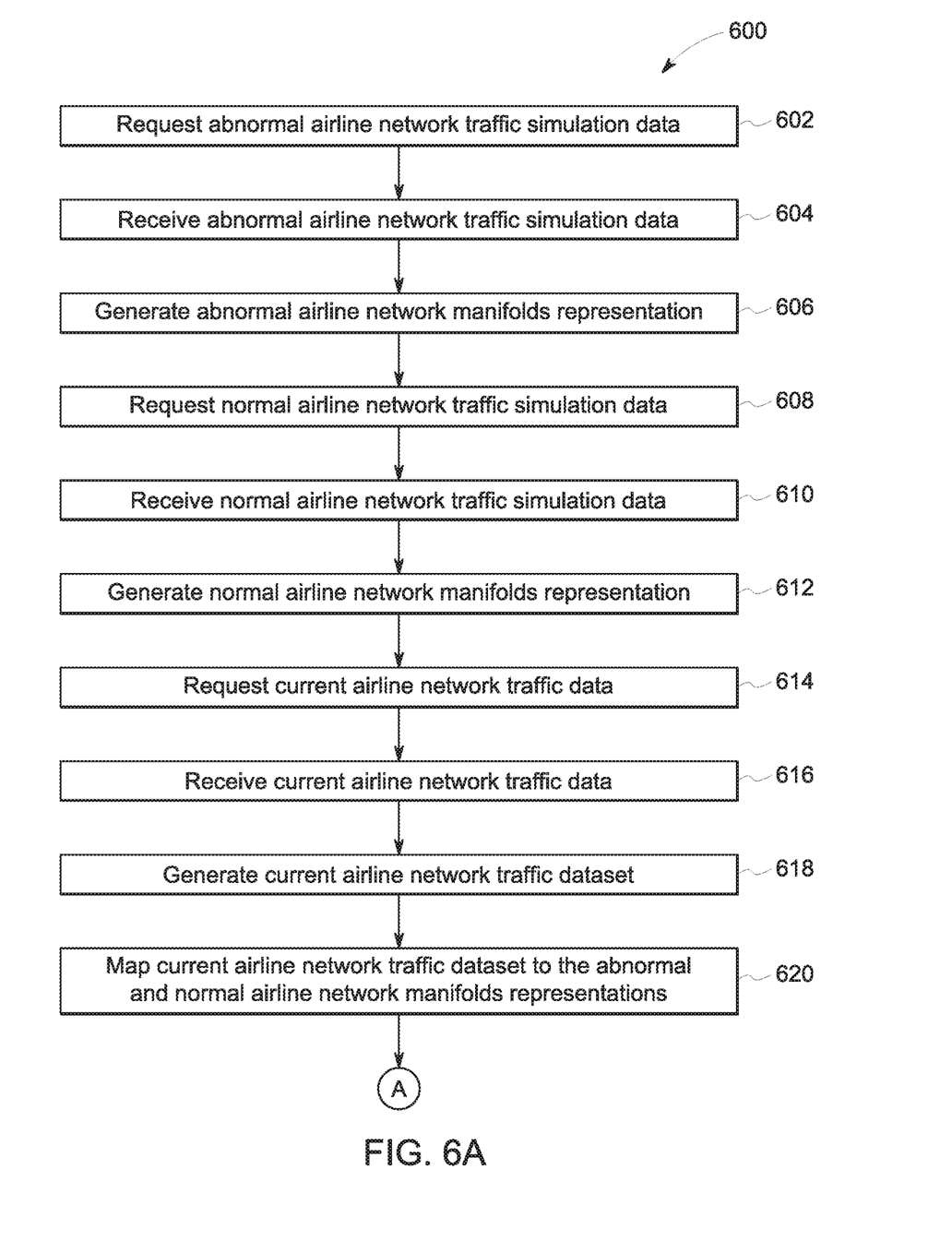
FIGS. 6A and 6B illustrate a flowchart of an airline network traffic manifolds learning process in accordance with some embodiments of the disclosure.
Figure 6B:
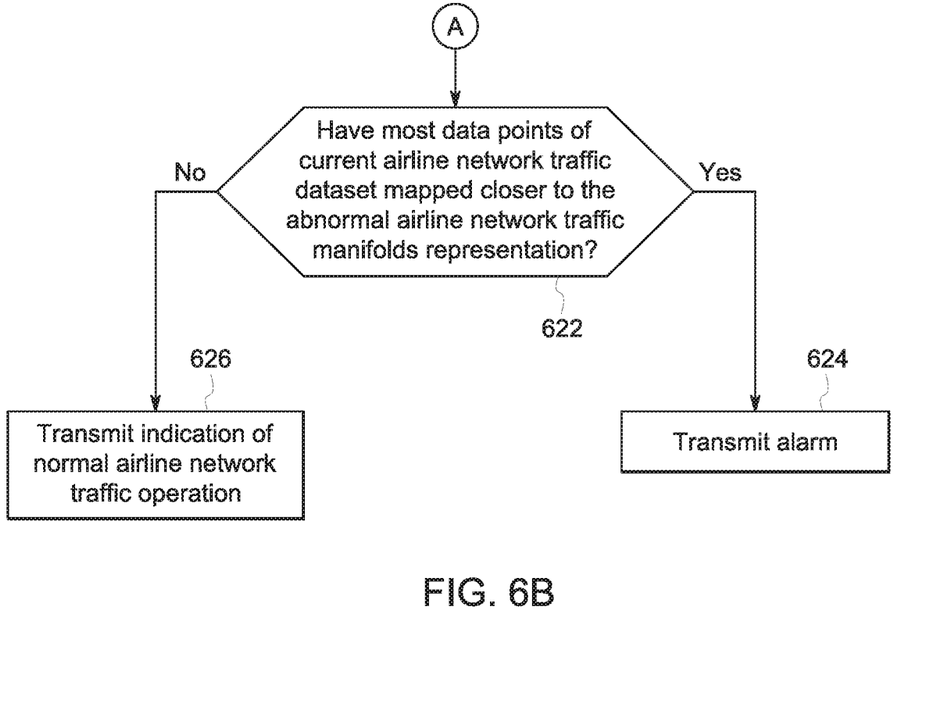

FIGS. 6A and 6B illustrate a flowchart 600 of a method for detecting airline network traffic disruptions according to some embodiments. A computer processor of a user computer transmits 602 a request for abnormal airline network traffic simulation data to a simulation device, receives 604 the abnormal airline network traffic simulation data, and then generates 606 an abnormal airline network traffic manifolds representation by utilizing a manifolds learning process on the abnormal airline network traffic simulation data. The process may also include the computer processor of the user computer transmitting 608 a request for normal airline network traffic simulation data to the simulation device, receiving 610 the abnormal airline network traffic simulation data, and then generates 612 a normal airline network traffic manifolds representation by utilizing a manifolds learning process on the normal airline network traffic simulation data. In some embodiments, the computer processor may also request historical airline network traffic data corresponding to abnormal airline network behavior and then combine that data with the simulation data associated with abnormal airline network behavior and then generate an abnormal airline network manifolds representation based on both (or based on only the historical airline network traffic data associated with abnormal behavior). Similarly, in some implementations, the computer processor may also request historical airline network traffic data corresponding to normal airline network behavior and then combine that data with the simulation data associated with normal airline network behavior before generating a normal airline network manifolds representation (or based on only the historical airline network traffic data associated with normal behavior).

Referring again to FIG. 6, the process also includes transmitting 614 a request for current airline network traffic data, receiving 616 the current airline network traffic data, generating 618 a current airline network traffic dataset and mapping 620 the current airline network traffic dataset to the normal and abnormal airline network traffic manifolds representations. In some embodiments, the user computer then compares the mapped current airline network traffic dataset to both the normal and abnormal airline network traffic manifolds representations, and then determines 624 whether most of the data points of the current airline network traffic dataset are close to or mapped onto the abnormal airline traffic manifolds representation. If so, then airline network traffic disruption may be imminent, and the user computer transmits 626 an indication or an alarm that a disruption may occur (or is occurring) to, for example, an airline operator device. If not, then in some implementations the user computer transmits 628 an indication of normal airline network traffic operation to, for example, a computer associated with an airline operator. In some implementations, the normal and abnormal airline manifolds representations may be displayed on a display screen of the user computer by the user computer processor along with the mapped data points of the current airline network traffic dataset for review by the user.

Accordingly, an airline network operator (or other airline personnel) can utilize a user computer to efficiently and quickly view early indications of impending airline network traffic disruption during actual airline operations in a manner that does not put undue pressure on airline operations personnel or that utilizes extra resources. It should be understood that additional processing permutations concerning the generation and comparisons of normal and abnormal airline network traffic manifolds representations to current airline network traffic datasets are possible and are contemplated, as are other methods for providing airline network traffic status information and/or indications of current airline network traffic to airline personnel or other persons. Thus, processes described herein allow a user or an airline network operator, for example, to quickly raise an alarm or provide a warning to AOC personnel (or other airline network operations personnel) when the data so indicates so that airline network traffic can be monitored closely and/or so that actions can be take action(s) to curtail an impending disruption, or the beginning of a disruption, in airline network traffic. For example, if the data indicates that airline network traffic will be disrupted soon due to a damaged aircraft and/or maintenance issue, an early indication of such may be transmitted to an airport or airports that may be able to provide assistance and/or repair any damage to either keep that aircraft flying or replace it with another aircraft.

This detailed description uses examples to disclose the invention and also to enable any person skilled in the art to practice the invention, including making and using any devices or systems and performing any incorporated methods. The scope of the invention is defined by the claims, and may include other examples that occur to those skilled in the art. Such other examples are contemplated as being within the scope of the claims if they have structural elements that do not differ from the literal language of the claims, and/or if they include equivalent structural elements with insubstantial differences from the literal languages of the claims. Aspects from the various embodiments described, as well as other known equivalents for each such aspects, can be mixed and matched by one of ordinary skill in the art to construct additional embodiments and/or techniques in accordance with principles disclosed herein.

Accordingly, the present invention has been described in terms of several embodiments solely for the purpose of illustration. Persons skilled in the art will recognize from this description that the invention is not limited to the embodiments described, but may be practiced with modifications and/or alterations limited only by the spirit and scope of the appended claims.

What is claimed is:

1. A method for detecting airline network traffic disruptions, comprising:
   transmitting, by a computer processor of a user computer to a simulation device, a request for abnormal airline network traffic simulation data;
   receiving, by the computer processor from the simulation device, abnormal airline network traffic simulation data; and
   generating, by the computer processor utilizing a manifolds learning process, simulated abnormal airline network traffic manifolds representation data;
   transmitting, by the computer processor to a current network traffic computer, a request for current airline network traffic data;
   receiving, by the computer processor from the current network traffic computer, the current airline network traffic data;
   generating, by the computer processor, a current airline network traffic dataset;
   mapping, by the computer processor, the current airline network traffic dataset to the abnormal airline network traffic manifolds representation;
   determining, by the computer processor, whether a threshold number of data points of the current airline network traffic dataset map to the abnormal airline traffic manifolds representation;
   transmitting, by the computer processor to an operator device, in response to a determining that a threshold number of data points of the current airline network traffic dataset map to the abnormal airline traffic manifolds representation, an alarm indicating that a disruption of airline network traffic is imminent; and
   wherein, in response to the alarm, one of a repair or a replacement of an aircraft in the network is performed.

2. The method of claim 1, further comprising:
   transmitting, by the computer processor to the simulation device, a request for normal airline network traffic simulation data;
   receiving, by the computer processor from the simulation device, normal airline network traffic simulation data; and
   generating, by the computer processor utilizing the manifolds learning process, simulated normal airline network traffic manifolds representation data.

3. The method of claim 1, further comprising, in response to a determining that a threshold number of data points of the current airline network traffic dataset do not map to the abnormal airline traffic manifolds representation,
   transmitting, by the computer processor to an operator device, an indication of normal airline network traffic.

4. The method of claim 2, further comprising:
   mapping, by the computer processor, the current airline network traffic dataset to the normal airline network traffic manifolds representation; and
   wherein the determining, by the computer processor, that a threshold number of data points of the current airline network traffic dataset map to the abnormal airline traffic manifolds representation includes comparing the current airline network traffic dataset map to the normal and abnormal airline network traffic manifolds representations.

5. The method of claim 1, further comprising:
   displaying, by the computer processor on a display device, a visual manifolds representation of the abnormal airline network traffic and data points associated with the current airline network traffic dataset.

6. The method of claim 2, further comprising:
   displaying, by the computer processor on a display device, a visual manifolds representation of the normal airline network traffic and the data points associated with the current airline network traffic dataset.

7. A system for detecting airline network traffic disruptions comprising:
   a user computer comprising a user computer processor operably connected to a non-transitory storage device and to a display device;
   an historical airline network traffic database operably connected to the user computer;
   a simulation device operably connected to the user computer; and
   a current airline network traffic computer operably connected to the simulation device;
   wherein the non-transitory storage device of the user computer stores executable instructions which when executed cause the user computer processor to:
   transmit a request for abnormal airline network traffic simulation data to the simulation device;
   receive abnormal airline network traffic simulation data from the simulation device; and
   generate, by utilizing a manifolds learning process, simulated abnormal airline network traffic manifolds representation data;
   transmit a request for current airline network traffic data to a current network traffic computer;
   receive the current airline network traffic data from the current network traffic computer; and
   generate a current airline network traffic dataset;
   map the current airline network traffic dataset to the abnormal airline network traffic manifolds representation;
   determine that a threshold number of data points of the current airline network traffic dataset map to the abnormal airline traffic manifolds representation; and
   transmit an alarm to an operator device indicating that a disruption of airline network traffic is imminent;
   wherein, in response to the alarm, a repair or a replacement of an aircraft in the network is performed.

8. The system of claim 7, wherein the non-transitory storage device of the user computer stores further executable instructions which when executed cause the user computer processor to:
   transmit a request for normal airline network traffic simulation data to the simulation device;
   receive normal airline network traffic simulation data from the simulation device; and
   generate, utilizing the manifolds learning process, simulated normal airline network traffic manifolds representation data.

9. The system of claim 7, wherein the non-transitory storage device of the user computer stores further executable instructions which when executed cause the user computer processor to:
   in response to a determining that a threshold number of data points of the current airline network traffic dataset do not map to the abnormal airline traffic manifolds representation;
   transmitting, by the computer processor to an operator device, an indication of normal airline network traffic.

10. The system of claim 8, wherein the non-transitory storage device of the user computer stores further executable instructions which when executed cause the user computer processor to:
  map the current airline network traffic dataset to the normal airline network traffic manifolds representation;
  a determination that a threshold number of data points of the current airline network traffic dataset map to the abnormal airline traffic manifolds representation includes comparing the current airline network traffic dataset map to the normal and abnormal airline network traffic manifolds representations.

11. The system of claim 7, wherein the non-transitory storage device of the user computer stores further executable instructions which when executed cause the user computer processor to:
  display a visual manifolds representation of the abnormal airline network traffic and data points associated with the current airline network traffic dataset.

12. The system of claim 8, wherein the non-transitory storage device of the user computer stores further executable instructions which when executed cause the user computer processor to
  display a visual manifolds representation of the normal airline network traffic and the data points associated with the current airline network traffic dataset on a display device.

\* \* \* \* \*